United States Patent
Beam et al.

(10) Patent No.: US 7,565,623 B2
(45) Date of Patent: Jul. 21, 2009

(54) SYSTEM AND METHOD FOR SELECTING A VIEW MODE AND SETTING

(75) Inventors: Tyler K. Beam, Redmond, WA (US);
David G. De Vorchik, Seattle, WA (US);
Colin R. Anthony, Kirkland, WA (US);
Charles Cummins, Seattle, WA (US);
Giampiero M. Sierra, Seattle, WA (US);
Kenneth M. Tubbs, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 57 days.

(21) Appl. No.: 10/837,069

(22) Filed: Apr. 30, 2004

(65) Prior Publication Data
US 2005/0246645 A1    Nov. 3, 2005

(51) Int. Cl.
*G06F 3/048* (2006.01)
(52) U.S. Cl. .................. 715/810; 715/833; 715/854
(58) Field of Classification Search ............. 715/810, 715/853, 864, 974, 902, 903, 718, 833, 840, 715/854
See application file for complete search history.

(56) References Cited

U.S. PATENT DOCUMENTS

| | | | | |
|---|---|---|---|---|
| 5,169,342 A | * | 12/1992 | Steele et al. ................. | 434/112 |
| 5,452,414 A | * | 9/1995 | Rosendahl et al. ........... | 715/836 |
| 5,491,782 A | | 2/1996 | King et al. | |
| 5,510,808 A | * | 4/1996 | Cina et al. .................. | 345/684 |
| 5,615,347 A | * | 3/1997 | Davis et al. ................. | 715/833 |
| 5,616,876 A | | 4/1997 | Cluts | |
| 5,739,817 A | * | 4/1998 | Glei et al. ................... | 715/787 |
| 5,777,616 A | | 7/1998 | Bates et al. | |
| 5,805,167 A | | 9/1998 | van Cruyningen | |
| 5,850,531 A | * | 12/1998 | Cox et al. ................... | 715/781 |
| 5,877,758 A | | 3/1999 | Seybold | |
| 6,204,846 B1 | | 3/2001 | Little et al. | |
| 6,215,490 B1 | | 4/2001 | Kaply | |
| 6,515,684 B1 | | 2/2003 | Knodt | |
| 6,590,594 B2 | * | 7/2003 | Bates et al. .................. | 715/784 |
| 6,629,104 B1 | * | 9/2003 | Parulski et al. .............. | 707/102 |
| 6,710,788 B1 | | 3/2004 | Freach et al. | |
| 6,738,787 B2 | * | 5/2004 | Stead ....................... | 707/104.1 |
| 6,741,232 B1 | * | 5/2004 | Siedlikowski et al. ........ | 345/156 |
| 6,778,192 B2 | * | 8/2004 | Arbab et al. ................. | 715/786 |

(Continued)

OTHER PUBLICATIONS

Microsoft® Windows, copyright 1998 (screenshots 1-3).*

(Continued)

*Primary Examiner*—Ting Zhou
(74) *Attorney, Agent, or Firm*—Shook, Hardy & Bacon L.L.P.

(57) ABSTRACT

A method and apparatus for selecting a view mode from a plurality of view modes and for selecting a setting within the selected view mode for displaying one or more items in a screen display. A single user input indicates both a selected view mode and a selected setting within that view mode. The input mechanism can be a hardware device, such as a keyboard or mouse, or a software control presented in a graphical user interface. The software view control may include a setting range display indicating a plurality of available settings, a view mode range display indicating a plurality of available view modes corresponding to the plurality of available settings, and a user selection component.

15 Claims, 10 Drawing Sheets

U.S. PATENT DOCUMENTS

| | | | | |
|---|---|---|---|---|
| 2002/0186252 | A1* | 12/2002 | Himmel et al. | 345/787 |
| 2004/0158132 | A1* | 8/2004 | Zaleski | 600/301 |
| 2004/0189856 | A1* | 9/2004 | Tanaka | 348/345 |
| 2005/0210403 | A1* | 9/2005 | Satanek | 715/786 |

OTHER PUBLICATIONS

Microsoft® Windows, copyright 1998 (Screenshots 1-4 are attached).*

Inside Mac OS X Aqua Human Interface Guidelines, Jun. 2002, p. 137, Apple Computer, Inc.

The Java Tutorial—How to Use Sliders, printed on Jun. 15, 2004 from publication location http://java.sun.com/docs/books/tutorial/uiswing/components/slider.html Sun Microsystems, Inc.

Java 2 Platform—Class JSlider, printed on Jun. 15, 2004 from publication location http://java.sun.com/j2se/1,4,2/docs/api/javax/swing/JSlider.html Sun Microsystems, Inc.

Microsoft Office Visio Professional 2003, screen shot Pan & Zoom Viewing Control, copyright 2003 Microsoft Corporation, 3 pages.

Non-Final Office Action mailed Jul. 13, 2007 for U.S. Appl. No. 10/922,635.

Non-Final Office Action mailed Oct. 10, 2007 for U.S. Appl. No. 10/922,603, now U.S. Patent No. 7,424,686.

Final Office Action mailed on Oct. 2, 2008 for U.S. Appl. No. 10/922,635.

Notice of Allowance mailed Jun. 16, 2008 for U.S. Appl. No. 10/922,603, now U.S. Patent No. 7,424,686.

* cited by examiner

SYSTEM AND METHOD FOR SELECTING A VIEW MODE AND SETTING

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to displaying items on a computer screen. More particularly, the present invention relates to an improved technique for selectively displaying items on a computer screen by allowing a user to simultaneously select a view mode and a setting within the selected view mode for displaying the items.

BACKGROUND OF THE INVENTION

A graphical user interface (GUI) provides an intuitive display of options available to the user using graphical controls in addition to text menus. Unfortunately, when the number of options within the interface becomes large, the sheer mass of information clutters the display confusing the user. This is known as the "information overload problem." An interface designer in these situations intentionally limits the single selection display and control to a smaller number of options that is comfortable to a user. By limiting the options, the user interface is easier to understand but requires more operations to perform the same action, and so efficiency for a trained user becomes limited. Selecting options using a single selection control also limits the ability to operate efficiently because a user must be able to distinguish between the intermediate states created by supplying each small additional amount of information. Until all selections are entered, the user must struggle with a partially configured user interface.

Figure 2A:
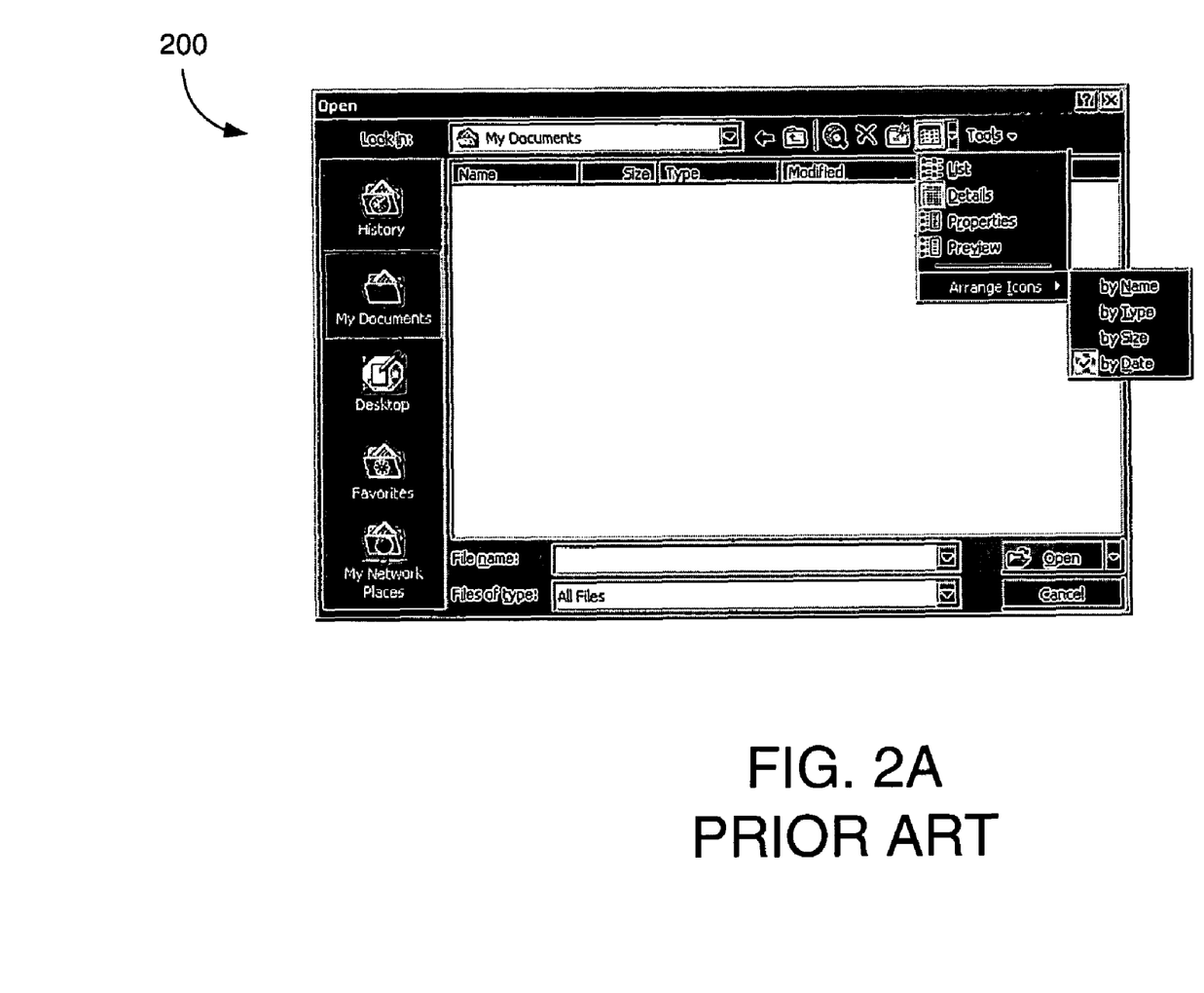
FIG. 2A is a screen display of a user interface for selecting a view mode from a plurality of view modes during a file open operation in a prior art word processing application program.

An obstacle to efficient GUI operation is having two different aspects of a display that can be adjusted independently. Either the display characteristics are independently adjustable, or "modes" are defined setting the adjustments to a particular configuration. The user must first select the mode, and then also select a setting within the mode. When a user of Microsoft® Word 2000™ opens a file (as shown in screen display 200 in FIG. 2A), the user may first select a view mode (e.g., List, Details, Properties, Preview), and additionally may select an order of presentation (e.g., Arrange by Name, Type, Size, or Date). This example requires the user to select a view and then separately select an order using two different operations. Likewise Microsoft® Windows® 2000™ allows icon size to be adjusted and the view to be selected through two independent controls. Again, two operations are required for a user to select the complete configuration. One potential solution is to display all possible combinations of the two parameters, but that solution can quickly become unmanageable even when there are only a few options for each parameter. For example, displaying 5 optional modes and 10 possible settings within each of those modes would require presentation of 50 separate options to the user.

The design challenge is also evident within the file management function of operating systems and application programs. The use of files is central to the use of a personal computer. As operating systems and application programs have advanced in complexity and functionality, the number and types of files that a user must manage has increased. Over the years, operating systems and application programs have provided various options for users to view their files and to correctly locate particular files. A list view provides more file details such as creation date, file name, and file type, referred to as metadata. An icon view may provide only the filename and the icon associated with the application used to create or edit the file. A thumbnail view provides a miniature picture of the content of the file (e.g., a photographic image from a digital camera). Each of these views is useful for different file types. More options benefit the user when selecting an appropriate view mode is an easy and intuitive operation.

Various control mechanisms have been used in past operating systems and file management applications. When there are just a few options, these options may be displayed as discrete buttons in a menu bar (e.g., one button for each mode), which provides for quick toggling between file view modes. When there are more than three or four options, a single button that activates a drop-down list of view modes provides quick access without requiring large amounts of screen real estate. Also useful for a relatively large number of options is a combined (or split) button that is divided such that half of the button cycles through the options, and the other half activates a drop-down list of view modes. The cycling action allows the user to view each option while the drop-down list allows the user to select the desired view mode with one action.

Another action related to file view modes is the sizing of the icon or thumbnail associated with the file. In various implementations, slider controls have been used to scroll the size of the icons from small to large over a continuous range. For example, this setting has sometimes been applied to all icons in all file views globally within an operating system. Alternatively, this setting has been applied to all icons in a specific window or folder.

Within these previous file view mode selectors, the size of the icons or thumbnails has not been user selectable by the same control as selects the view mode (detailed list, icon, thumbnail). The amount of metadata shown within a particular view mode has not been configurable within the file view mode selector control. Moreover, the amount of metadata shown within a particular view mode has not been driven by icon size.

The proliferation of view modes for file list windows within the operating system necessitates an improved user interface control to harness the power of multiple options. Current file view mode options include a detailed list view with configurable degree of metadata and icon sizes, a tiled view with larger icons, but generally less metadata displayed, and thumbnail or icon views with images configurable from small to large.

Each of these different file view modes is appropriate for different file types. An appropriate view mode is one that is most helpful to the user for selecting the correct file the first time. Thumbnails are useful for selecting images, especially those captured by a digital camera where the file name is likely a number determined by the camera, which is not familiar to the user. A detailed list with many metadata fields displayed may be more appropriate when selecting among text documents, possibly with different create dates or authors, where the file name is likely descriptive of the content. A tiled view combines the best of both detailed and thumbnail views for directories of mixed file types.

Figure 2B:
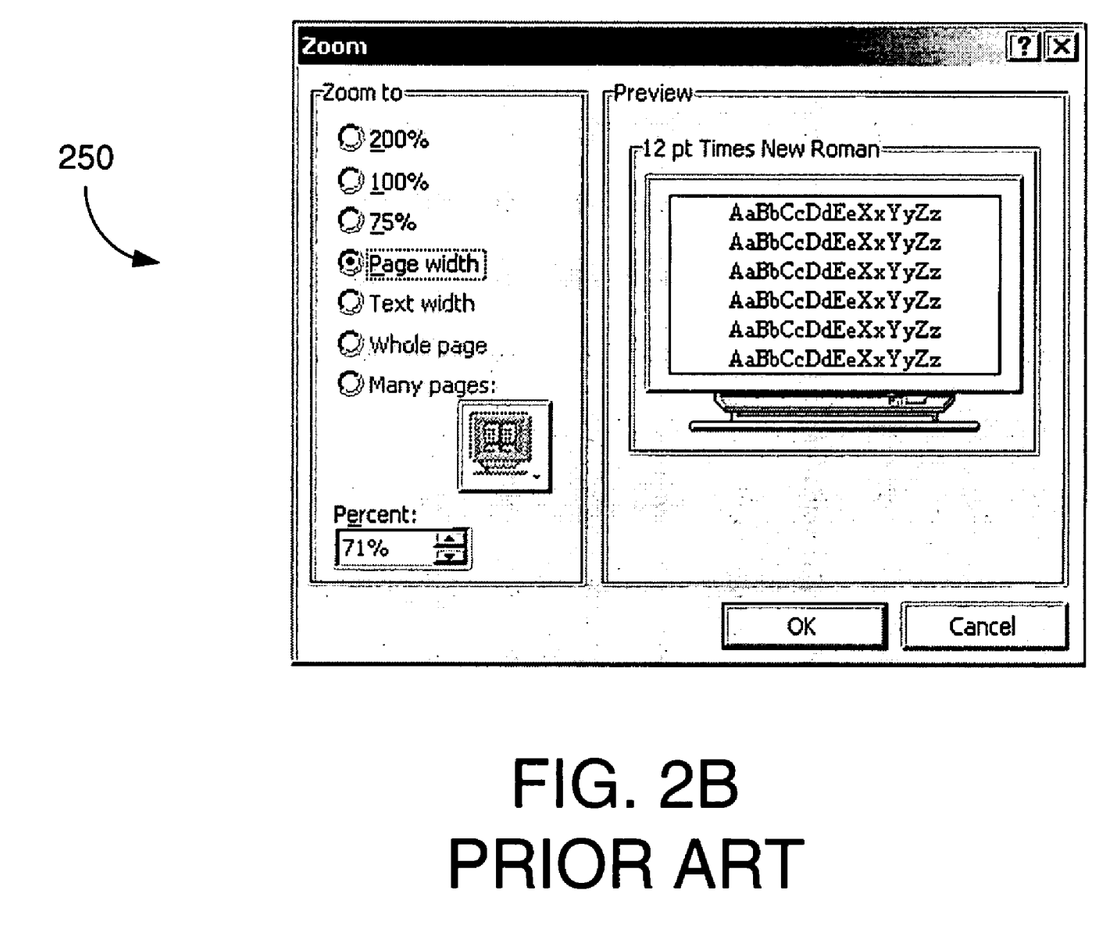
FIG. 2B is a screen display of a user interface presenting a plurality of alternative controls for the same parameter, namely the amount of zoom, in a prior art word processing application program.

Another obstacle to graphical operation is encountered when there are two (or more) alternative ways to control the same parameter(s), and the controls are convenient at different times. When both controls are made available they are typically described with text so that the user understands that they really control the same parameter(s). For example, as shown in screen display 250 in FIG. 2B, the zoom control in Microsoft® Word 2000™ presents different alternatives for selecting the amount of zoom. The user can either input a percentage of the actual presentation, or, alternatively, a descriptive selection is available such as: Zoom to (page width, text width, whole page, many pages). This requires more than one operation because it requires the user to find the zoom control, and then experiment with the alternatives until the user finds the right percentage for his or her document. If, for example, the user settles on 71% after experimentation, the user has no visual cue indicating how this final selection is related to the offered preferred settings. The next time that user is faced with the same problem, he or she will be forced to remember "71" or else go through the same experimentation.

There has long been a need in the GUI design area to provide some method for simplifying the information overload problem in a way that is intuitive for the user to understand and operationally efficient once the interface has been learned. This is particularly true when there are two parameters which must be simultaneously controlled, or when there are two alternatives for controlling the same parameter which need to be visually displayed and controlled by the user.

Moreover, there is a need for a convenient control for users to select among various file view modes either discretely with preset buttons or continuously with a slider control that not only selects the view mode but also modifies the size of icons or thumbnails and varies the amount of metadata displayed. By controlling both the view mode and sizing with a single control, a user could quickly customize the file view mode in one action. Such a combination of continuous and discrete controls would provide both ease of use for the novice user as well as specific control for the user who desires a particular view mode including size and detail preferences.

SUMMARY OF THE INVENTION

The present invention meets the above needs and overcomes one or more deficiencies in the prior art by providing an improved technique for allowing a user to select a view mode and a setting within the selected view mode with a single selection. One aspect of the present invention provides a computer-implemented method for selecting a view mode and a setting within that view mode for one or more items in a screen display. Upon obtaining a single user input indicative of a selection of one of a plurality of available view modes and also indicative of a selection of a setting within the selected view mode, the method maps the single user input to the selected view mode and maps the single user input to the selected setting within that view mode.

In another aspect of the invention, a graphical user interface is provided which includes a screen display and a view control. The view control is presented in the screen display, and the view control obtains a single user input indicative of both a selected view mode and a selected setting within the selected view mode.

Still another aspect of the present invention is a view control presented in a graphical user interface for user selection of a view mode and a setting within that view mode. The view control includes a setting range display indicating a plurality of available settings, a view mode range display indicating a plurality of available view modes corresponding to the plurality of available settings, and a user selection component which receives a single user selection indicative of one of the available settings and one of the available view modes.

Yet another aspect of the invention is an apparatus for selecting a view mode and a setting within that view mode for a screen display in which one or more items may be displayed in a plurality of view modes. The apparatus includes an input mechanism for obtaining a single user input indicative of both a selected view mode and a selected setting. The apparatus also includes computer-executable instructions for mapping the single user input to the selected view mode and for mapping the single user input to the selected setting within that view mode.

A further aspect of the invention provides a computer system configured for user selection of a view mode and a setting within that view mode for a screen display in which one or more items may be displayed in a plurality of view modes. The system allows a user simultaneously to select one view mode from two or more available view modes and a selected setting within the selected view mode. The system then applies the view mode and selected setting in response to the single user selection.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides an improved technique for selectively displaying items on a computer screen by allowing a user to simultaneously select a view mode and a setting within the selected view mode for displaying the items. An exemplary operating environment for the present invention is described below.

Figure 1:
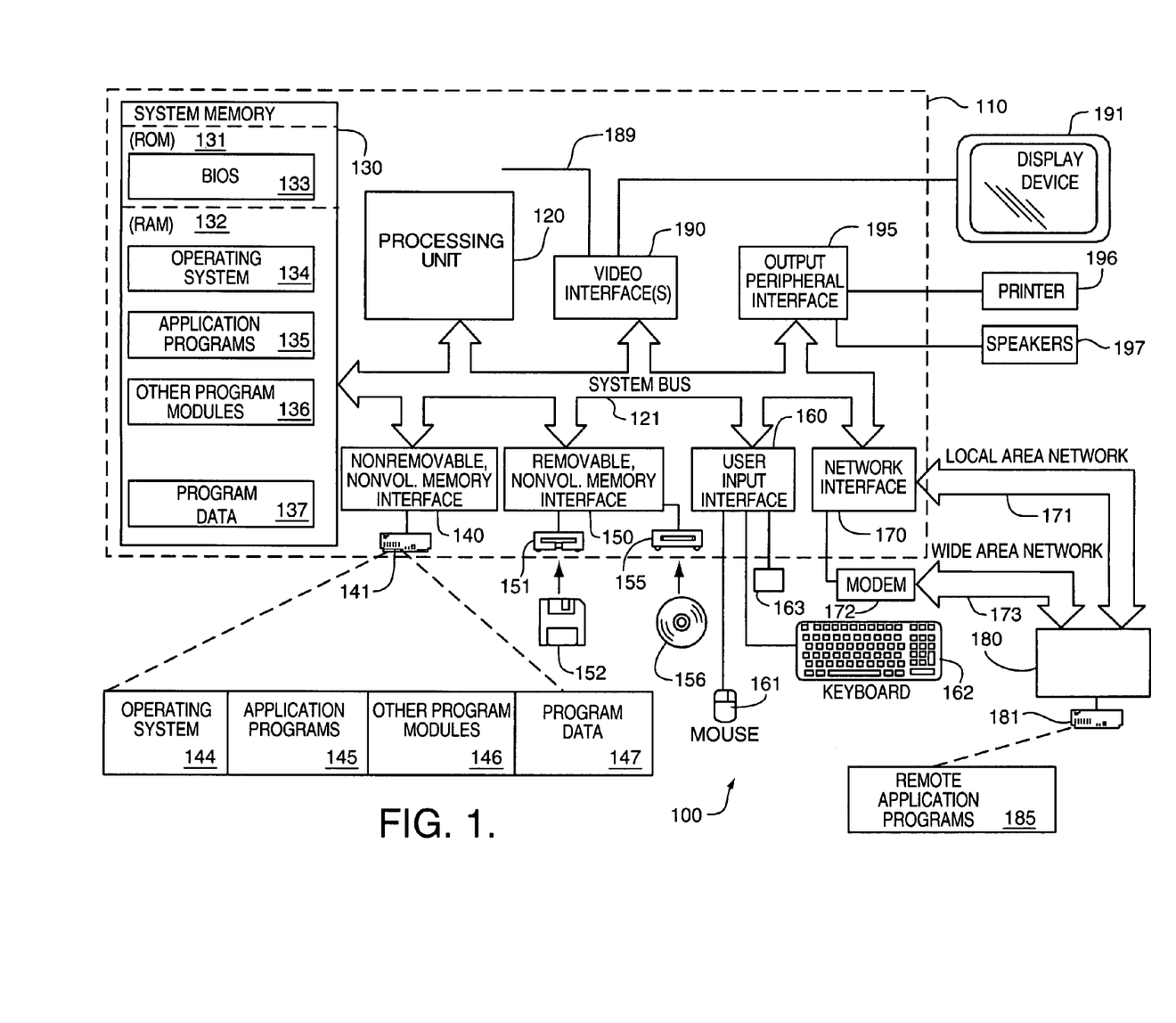
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a screen with user input capacity such as touch-screens and screens capable of receiving stylus inputs; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN)

171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 3:
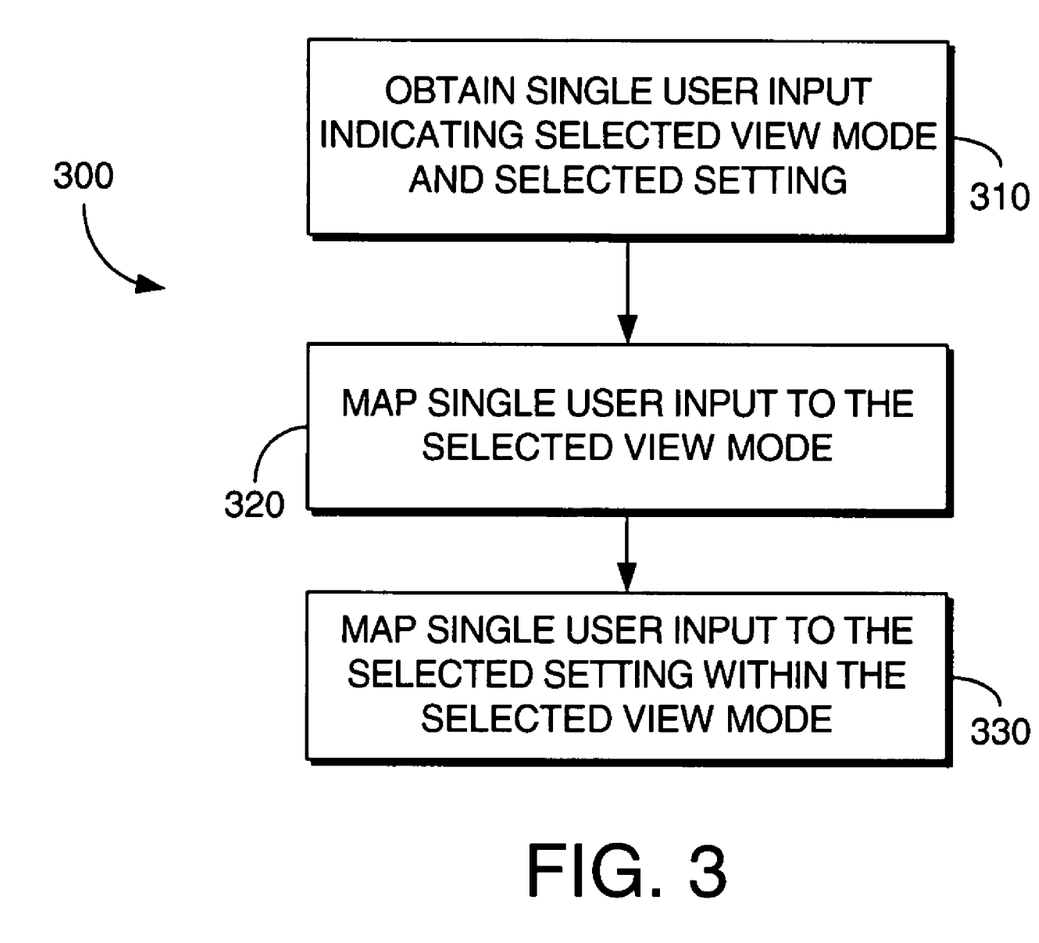
FIG. 3 is a flow diagram showing a method for selecting a view mode and a setting within that view mode for one or more items in a screen display in accordance with an embodiment of the present invention.

FIG. 3 depicts a flow diagram showing a computer-implemented method 300 for selecting a view mode and a setting within that view mode for one or more items in a screen display in accordance with an embodiment of the present invention. At 310, the method 300 obtains a single user input indicative of a selection of one of a plurality of available view modes and also indicative of a selection of a setting within the selected view mode. As those skilled in the art will appreciate, such a user input may be obtained via an input mechanism such as a hardware input device or a software view control presented in a graphical user interface. Upon obtaining the single user input, the method maps the input to the selected view mode at 320 and maps the single user input to the selected setting within that view mode at 330. Preferably, the single user input is mapped to the selected view mode and the selected setting at substantially the same time.

Figure 4:
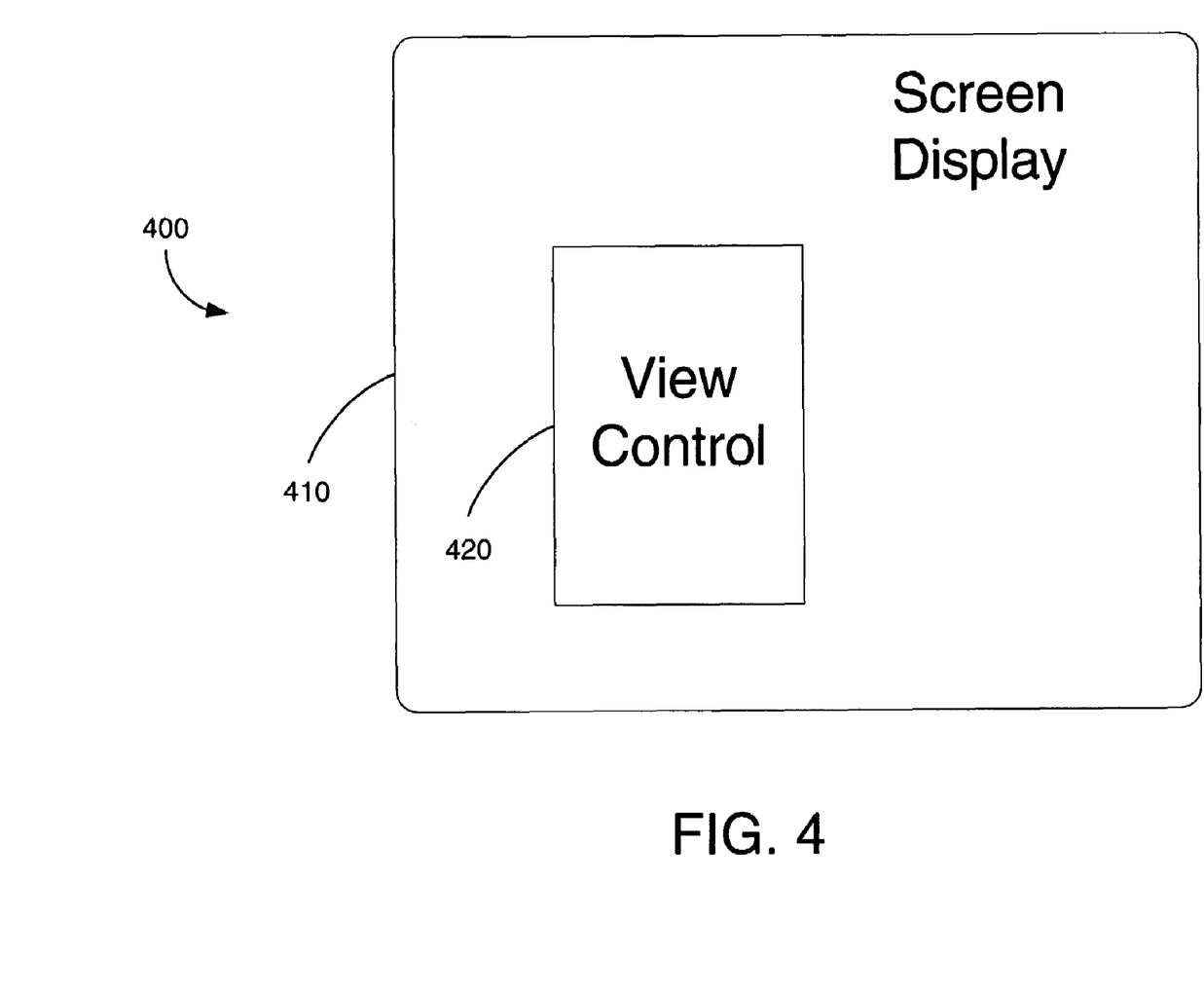
FIG. 4 is a diagram of a graphical user interface having a screen display and view control in accordance with an embodiment of the present invention.

Turning to FIG. 4, a graphical user interface 400 is presented. The GUI 400 includes a screen display 410 and a view control 420 in accordance with an embodiment of the present invention. The screen display 410 may be a conventional computer monitor screen display as is well-known in the art and will therefore not be discussed in further detail herein. However, the view control 420 advances the state of the art by mapping a single user selection to a selected view mode and a selected setting within that view mode. Several exemplary embodiments of the view control of the present invention are set forth in FIGS. 5-9.

Figure 5:
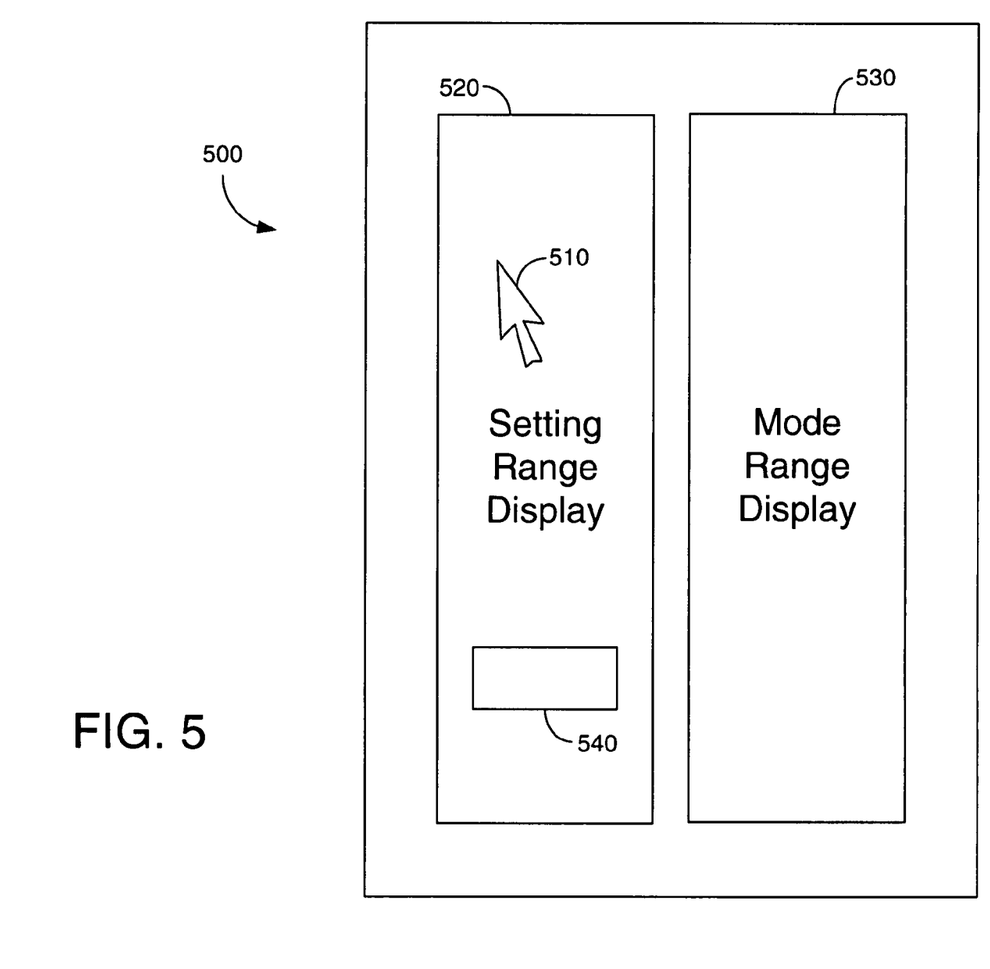
FIG. 5 is a diagram of an exemplary view control in accordance with an embodiment of the present invention in which the view control includes a setting range display, a view mode range display and a user selection component operable to receive a single user selection indicative of a view mode and a setting within the selected view mode.

FIG. 5 shows a view control 500 with a pointer 510 hovering thereover. The view control 500 includes a setting range display 520 for displaying available settings and a mode range display 530 for displaying available modes. A selection indicator 540 is positioned within the setting range display 520 to indicate a user selection. One example of a view mode setting is icon size. Alternatively, "setting" could refer to other parameters such as an arrangement or ordering of displayed items based on name, type, date, etc.

Figure 6:
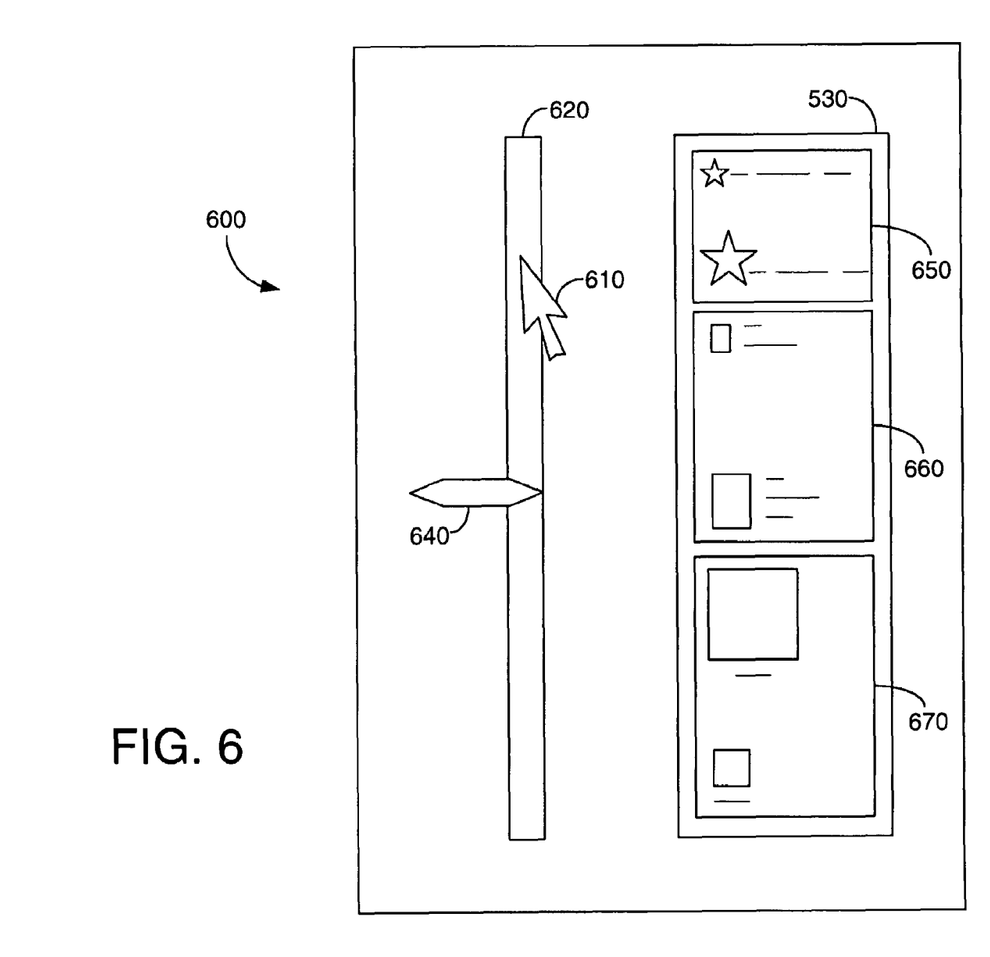
FIG. 6 is a diagram of the view control of FIG. 5, wherein the setting range display includes a slider and wherein the view mode range display includes three available view modes with default settings in accordance with an embodiment of the present invention.
Figure 7:
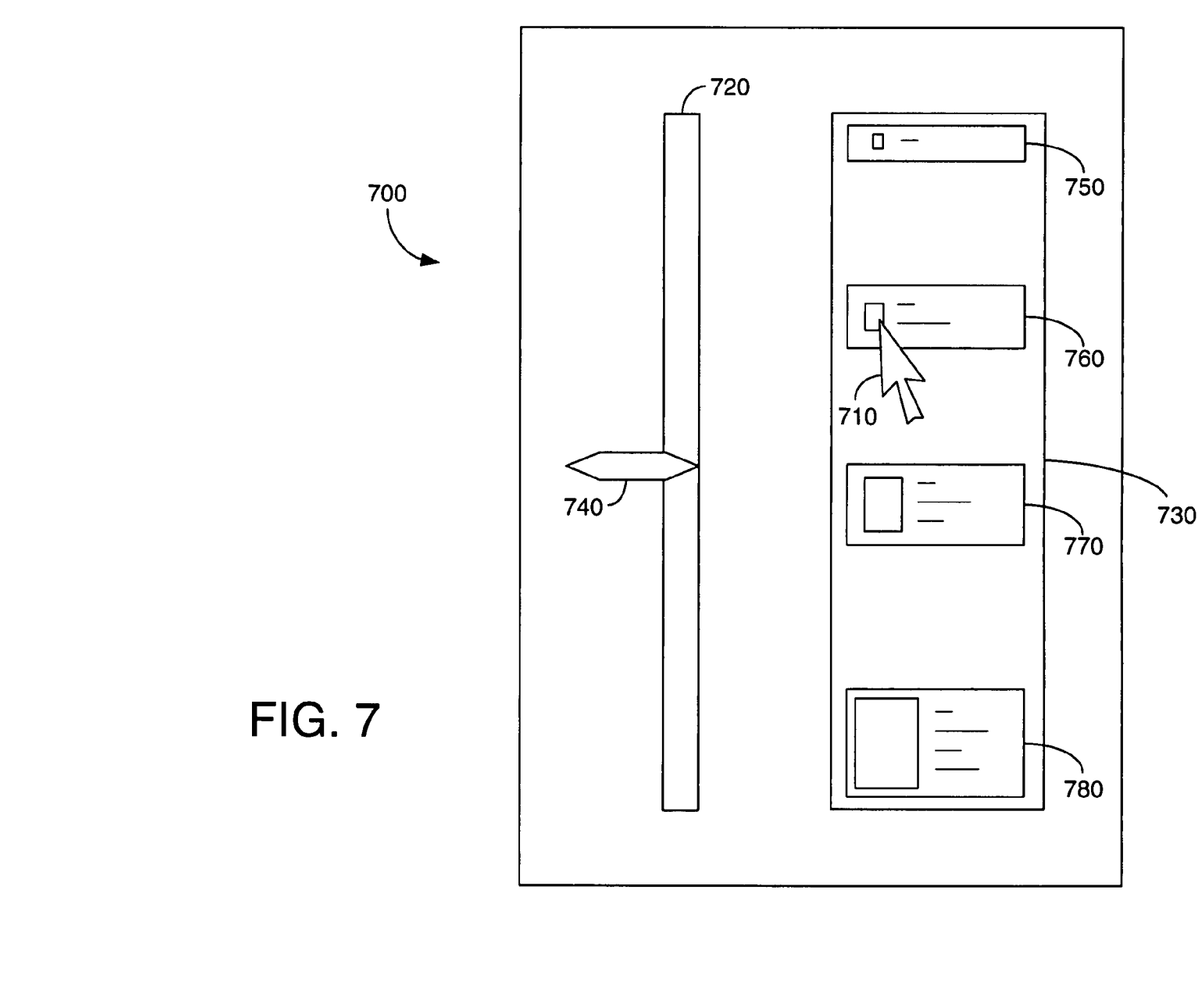
FIG. 7 is a diagram of an exemplary view control in accordance with an embodiment of the present invention in which the view control includes a setting range display, a view mode range display including a menu with multiple default settings, and a user selection component.

Referring next to FIGS. 6 and 7, exemplary view controls 600 and 700 are depicted. The view control 600 includes a setting range display 620 in the form of a slider input which utilizes a selection indicator 640 to reflect a user selection. Similarly, the view control 700 includes a setting range display 720 in the form of a slider input which utilizes a selection indicator 740 to reflect a user selection. As those skilled in the art will appreciate, the slider controls 620 and 720 preferably provide an end user with a continuous spectrum of available settings to choose from using, for example, pointers 610 and 710 to manipulate selection indicators 640 and 740 and select any of a plurality of settings. Alternatively, the slider controls 620, 720 may provide an end user with multiple, discrete settings which are available.

The view controls 600, 700 include respective mode range displays 630 and 730. The mode range display 630 presents an indicator 650 for Mode A, an indicator 660 for Mode B, and an indicator 670 for Mode C. More than one setting is presented to the user in each of the modes 650, 660, 670 shown in FIG. 6 to assist the user in selecting a particular mode and setting. Although mode range display 630 illustrates three mode indicators, the invention is not limited to a particular number of modes or mode indicators. Rather, the exemplary embodiment of the present invention shown in FIG. 6 contemplates user selection of one mode from two or more available modes. Examples of view modes include: List, Details, Tiles, Properties, Preview, Icons, Large Icons, Medium Icons, Small Icons and Thumbnails. Those skilled in the art will appreciate that the foregoing list of exemplary modes is a non-exhaustive list and that many other modes are contemplated by the present invention. Similarly, many other settings in addition to those mentioned above are within the scope of the present invention.

In FIG. 7, the mode range display 730 depicts a single mode having four discrete, default settings 750, 760, 770, 780. Preferably, each default setting is represented by a button. As shown in FIG. 7, a user may select the setting 760 by hovering a pointer 710 over that button and selecting it to invoke the selected setting and view mode. It should be noted that the icon size and amount of metadata increases in FIG. 7 as the selection indicator 740 moves in a downwardly direction. However, in an alternative exemplary design, the size and/or amount of metadata shown may actually be deliberately decreased because the increasing size of the icon limits the amount of available space.

The image displayed within a setting may be a function of the item displayed and/or icon size. For example, if the item displayed is a shortcut, it could be represented by an appropriate icon irrespective of size. But if the item is a Word™ document, and the image size selected is large enough, then a rendering of the document content may be presented to the user in a miniature facsimile. If the item is a single photo, then a likeness of the entire image may be represented.

Figure 8:
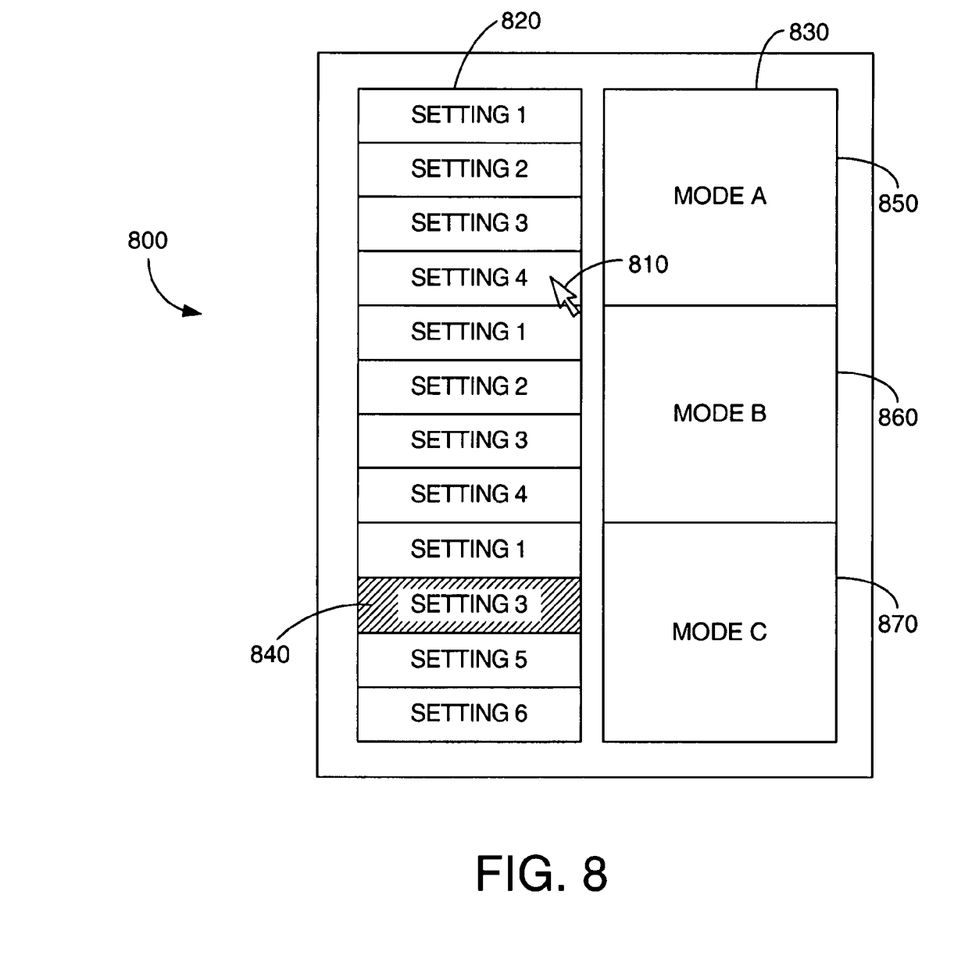
FIG. 8 is a diagram of the view control of FIG. 5, wherein the setting range display includes a menu with multiple default settings, and wherein the view mode range display includes three available view modes in accordance with an embodiment of the present invention.

With reference to FIG. 8, an exemplary view control 800 includes a discrete range of setting displays 820 and a discrete range of corresponding modes 850, 860 and 870. Each of the modes 850, 860, 870 is associated with one or more settings in the setting range display. If for example, there are six discrete settings (i.e., settings 1-6), some of them may be applicable to one or more modes. As shown in FIG. 8, settings 1-4 are applicable to Mode A and Mode B, and settings 1, 3, 5 and 6 are applicable to Mode C. The shading 840 indicates that setting 3 in Mode C is the currently selected state.

Figure 9:
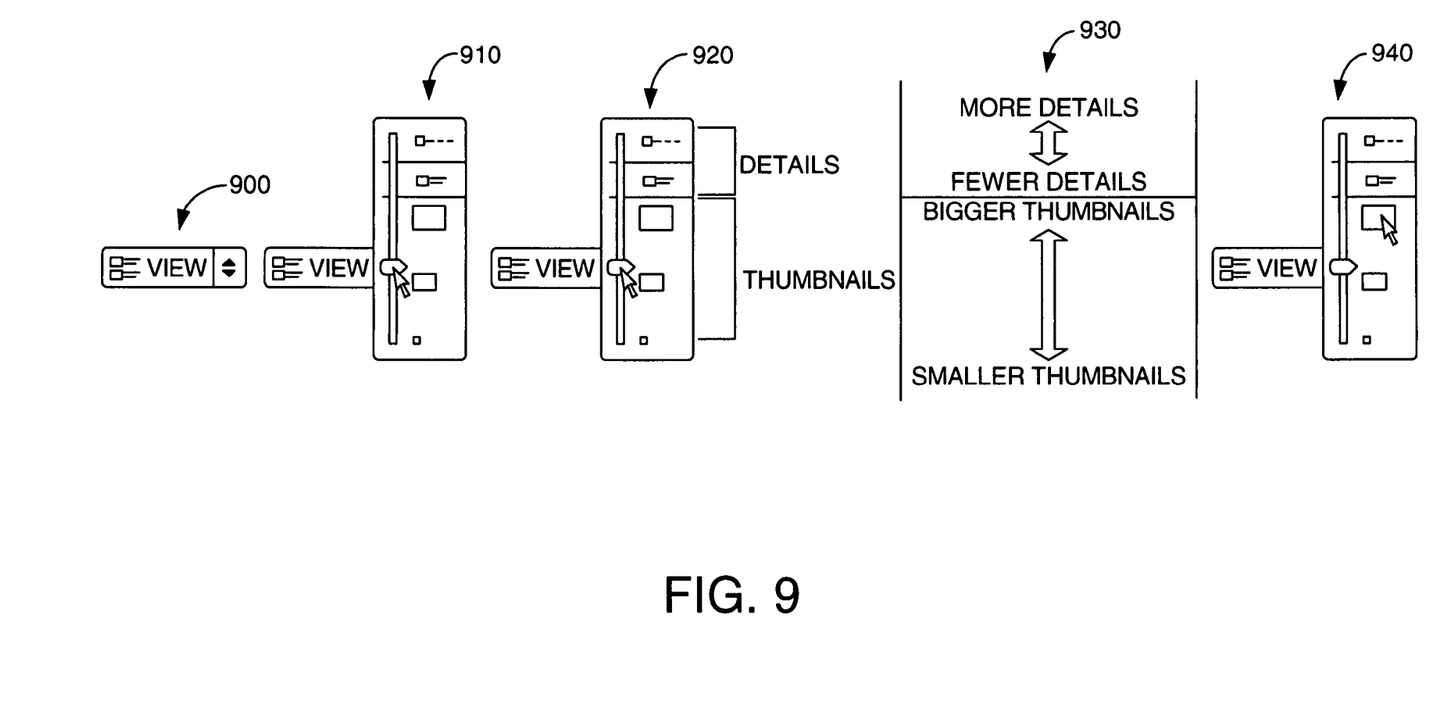
FIG. 9 is a diagram representative of an exemplary implementation of a view control in accordance with an embodiment of the present invention.

FIG. 9 is a diagram representative of an exemplary implementation of a view control in accordance with an embodiment of the present invention. A split button control 900 may be located in any convenient portion of the screen display. By selecting the left-hand side of button 900, the view state toggles between the available modes and a preferred setting which is associated with each mode. The face of the left-hand portion of the split button changes upon activation to indicate the currently selected mode. The preferred setting is a stored value of view setting that is different for each mode and has a prior value determined by prior adjustment or by the location of the items displayed or by system-wide indication. The user may change the preferred setting by activation and selection of a mode and setting using the right-hand side of the split button 900.

The setting and mode may be simultaneously selected by clicking on the right half of the split button to activate a slider control, and then adjusting the selection indicator as shown in 910. For example, a user may click on the right half of button 900 and hold the mouse button down, in which case the user can move the selection indicator up or down and release the mouse button to make the selection. Alternatively, a user may click on the right half of button 900 and immediately release the mouse button, in which case the user can then navigate with the pointer to the desired position on the slider control and select the desired mode and setting by clicking on the desired position. There are many other in which the user can navigate up or down the slider control, such as a combination of one or more keystrokes or holding the control key down while moving the mouse wheel. The slider control may be configured to automatically dismiss itself at some point in time after the selection has been made by the user.

The selection indicated in 910 adjusts the icon size in a thumbnail view mode and selects the setting of icon size which is slightly larger than the middle setting. The view modes represented in the mode indication display include details icon view mode at the top of the mode display, details tiles view mode in the middle of the mode display, and thumbnail view mode (as indicated in 920). The details view mode may, for example, include all of the metadata sequentially in horizontal arrangement. As the selection indicator is moved downwardly along the slider input through the details view mode, the amount of metadata is decreased as a function of the displacement of the selection indicator. This change in the amount of metadata can be linear or non-linear with respect to the vertical displacement of the selection indicator. Similarly, as shown in 930, the size of the thumbnails increase as the selection indicator is moved upwardly along the slider input through the thumbnails view mode. As shown in 940, the mode range display serves as an alternative control to the slider control so that a user may click on a default setting displayed in a menu to select both the mode and the setting with a single selection. One skilled in the art will readily appreciate that many alternative implementations are contemplated by and within the scope of the present invention.

In the case of a continuous slider input, each location on the slider corresponds to a discrete value (or setting) within a range represented, for example, as a percentage between 1% and 100%. Every value in that range corresponds to an icon size and view setting. Importantly, the range in this example is not limited to 100 values. Rather, the continuous slider input can be designed to achieve any level of granularity, such as 3.00001% (as opposed to 3% or 3.01%). Moreover, the relationship between that value and icon size is not necessarily direct or linear. A point in the middle of the smallest thumbnail and the largest thumbnail will not necessarily result in a thumbnail half of the size of the largest thumbnail.

As a further example, the range of 41% to 100% may correspond to thumbnails view with icon sizes of 256-16 pixels (large to small), and the range of 1% to 40% may correspond to icons sizes of 16-96 pixels (small to large). Within the range of 1% to 40%, the sub-range of 1% to 10% corresponds to details view and the sub-range of 11% to 40% corresponds to tiles view. In this example, each view mode handles specific layout issues. Thumbnails view handles whether text is centered underneath the thumbnail (for large thumbnails) or left aligned next to the thumbnail (small thumbnails). Details view handles layout issues such as how to align an icon with text. Tiles view handles layout issues such as how many lines of metadata are to be displayed next to the icon. For each of the views, the last slider value is remembered independently for this range so that the view is the same size it was the last time it was utilized.

Some points along the slider may cause "snapping." For instance, the slider can be designed to snap to the 40% value. It may be impossible to position the slider at 41% to 43% or from 37% to 39% without having the slider jump to the 40% position. Multiple locations on the slider may snap to respective, discrete values in the range.

Alternative embodiments and implementations of the present invention will become apparent to those skilled in the art to which it pertains upon review of the specification, including the drawing figures. Accordingly, the scope of the present invention is defined by the appended claims rather than the foregoing description.

We claim:

1. A graphical user interface embodied on one or more computer-readable storage media and executable on a computer, said graphical user interface comprising:
   a screen display for displaying one or more items in one of a plurality of available file view modes for a file list window in an operating system; and
   a slider input control presented in the screen display and operable to obtain a single user input indicative of both a selected file view mode and a selected setting within the selected file view mode, wherein the single user input substantially simultaneously selects the selected file view mode and the selected setting,
   an alternative control to the slider input control presented in the screen display and operable to obtain a single user input indicative of both a selected file view mode and a selected setting within the selected file view mode, wherein the single user input substantially simultaneously selects the selected file view mode and the selected setting, wherein the selected file view mode and the selected setting define a presentation scheme for each of the items presented in the file list window on the screen display.

2. The graphical user interface of claim 1, wherein the alternative control comprises a menu input.

3. The graphical user interface of claim 1, wherein the alternative control includes a button for user selection of a default file view mode and setting from a plurality of available default file view modes and settings by cycling through the available default file view modes and settings sequentially in response to each user input to the button.

4. The graphical user interface of claim 3, wherein the default settings are represented by graphical objects.

5. The graphical user interface of claim 4, wherein the face of the button graphically depicts the selected default file view mode.

6. One or more computer readable storage media including computer-executable instructions that, when executed, provide one or more graphical user interface components, comprising:

a screen display for displaying one or more items in one of a plurality of available file view modes for a file list window in an operating system;

a slider input control presented in the screen display and operable to obtain a single user input indicative of both a selected file view mode and a selected setting within the selected file view mode, wherein the single user input substantially simultaneously selects the selected file view mode and the selected setting; and an alternative control to the slider input control presented in the screen display and operable to obtain a single user input indicative of both a selected file view mode and a selected setting within the selected file view mode, wherein the single user input substantially simultaneously selects the selected file view mode and the selected setting, wherein the selected file view mode and the selected setting define a presentation scheme for each of the items presented in the file list window on the screen display.

7. The one or more computer readable storage media of claim 6 wherein the alternative control comprises a menu input.

8. The one or more computer readable storage media of claim 6 wherein the face of the button graphically depicts the selected default file view mode.

9. The one or more computer readable storage media of claim 8 wherein the default settings are represented by graphical objects.

10. The one or more computer readable storage media of claim 9 wherein the face of the button graphically depicts the selected default file view mode.

11. A computing device, comprising:

one or more processing units; and one or more computer readable storage media including computer-executable instructions that, when executed by the one or more processing units, provide one or more graphical user interface components, comprising:

a screen display for displaying one or more items in one of a plurality of available file view modes for a file list window in an operating system;

a slider input control presented in the screen display and operable to obtain a single user input indicative of both a selected file view mode and a selected setting within the selected file view mode, wherein the single user input substantially simultaneously selects the selected file view mode and the selected setting; and an alternative control to the slider input control presented in the screen display and operable to obtain a single user input indicative of both a selected file view mode and a selected setting within the selected file view mode, wherein the single user input substantially simultaneously selects the selected file view mode and the selected setting, wherein the selected file view mode and the selected setting define a presentation scheme for each of the items presented in the file list window on the screen display.

12. The computing device of claim 11 wherein the alternative control comprises a menu input.

13. The computing device of claim 11 wherein the face of the button graphically depicts the selected default file view mode.

14. The computing device of claim 13 wherein the default settings are represented by graphical objects.

15. The computing device of claim 14 wherein the face of the button graphically depicts the selected default file view mode.

* * * * *